Patented Sept. 18, 1934

1,973,865

UNITED STATES PATENT OFFICE 1,973,865

METHOD FOR HYDROGENATING RESINOUS COMPOUNDS

Rollin J. Byrkit, Jr., Marshallton, Del., assignor to Hercules Powder Company, Wilmington, Del., a corporation of Delaware No Drawing. Application March 17, 1933, Serial No. 661,370

15 Claims. (Cl. 260—99.40)

This invention relates to a method for hydrogenation of compounds containing a resinic radical.

Heretofore it has been known to effect hydrogenation of compounds containing an unsaturated resinic radical, as compounds containing the abietyl nucleus, by dissolving the compound in acetic acid and agitating in an atmosphere of hydrogen in the presence of an active noble metal hydrogenation catalyst. By such procedure 60-70% hydrogenation of the two double bonds in the resinic radical may be obtained in several hours and complete saturation by prolonged treatment. However, due to the resistance to hydrogenation of one of the two double bonds, it is difficult, following the above procedure, to obtain complete saturation of both of the unsaturated double bonds, which is desirable in commercial uses of hydrogenated abietyl compounds and in order to do so the use of a relatively large amount of catalyst, the use of higher hydrogen pressure and increased temperature is required, and the time of treatment must be greatly prolonged.

The prior procedure outlined is further disadvantageous from the standpoint of initial cost and difficulty in recovery of acetic acid. The substitution of neutral organic solvents for acetic acid has been suggested, but such has resulted in the attainment of much lower degrees of saturation (up to only about 25%).

Now in accordance with this invention, it has been found that satisfactory hydrogenation of compounds containing an unsaturated resinic radical and saturation of both double bonds of the resinic radical when desired may be obtained readily and with a saving in time and cost over prior methods by effecting the hydrogenation of the compound in solution in an inert solvent containing a small amount of an activating acid.

The procedure involved in effecting hydrogenation consists in treatment with an activating acid, and with hydrogen in the presence of a noble metal catalyst. The procedure may be carried out under atmospheric or higher pressure and at ordinary room temperature or at a higher temperature, and the amount of catalyst and of activating acid used may be widely varied, all with the use of skill in the art and without departing from the scope of this invention.

In the practical adaptation of this invention the hydrogenation of various compounds containing an unsaturated resinic radical such as, for example, pimaric acid, abietic acid, wood rosin, gum rosin, isomerized abietic acid, abietyl alcohol, rosin oil, abietic acid or rosin esters, as methyl, ethyl, butyl, benzyl, glycol, glycerol, abietates, etc. Where wood or gum rosin is used the rosin may be refined as by distillation, treatment with activated carbon, fuller's earth, etc., or by crystallization, by treatment with a selective color body solvent, as furfural, phenol, etc., or otherwise. Likewise, other compounds may be given various pretreatments for their refinement or for other purposes prior to treatment in accordance with this invention.

The inert solvent for use in the hydrogenation of the compound containing a resinic radical to be hydrogenated may be any suitable inert solvent for the compound. The solvent will desirably be a neutral solvent, as ethyl alcohol, butanol, methanol, benzene, toluene, diethyl ether, ethyl acetate, petroleum ether, petroleum naptha, mineral spirits, gasoline, etc.; though an organic acidic solvent, as acetic acid, butyric, propionic, etc. may be used. The particular solvent for use in connection with the treatment of any particular compound will desirably be chosen with reference to its solvent power on the particular compound.

The activating acid may be any organic or inorganic acid, as acetic, formic, butyric, propionic, monochloracetic, dichloracetic, trichloracetic, p-toluene sulphonic, hydrochloric, phosphoric, nitric, sulphuric, etc. It is noted that where acetic acid is used as the solvent and it is desired to use an inorganic acid as the activating acid, some other acid than acetic acid will be chosen; and further that generally it will be desirable, though not essential, that an acid having a high ionization constant, such as hydrogen chloride, be used.

The amount of activating acid used may be widely varied, but, for example, may be within the range 0.1–25.0% of the solvent by weight. However, an amount within about the range 0.5–3.0% of the solvent will be found satisfactory.

The noble metal catalyst may be any of the catalysts heretofore used, as platinum, palladium, Adams platinum oxide catalyst, etc., or mixtures thereof, either pure or containing the usual impurities of commercial grade. The catalyst may be in colloidal solution or non-colloidal form and, if desired, may be supported, as on pumice, kieselguhr, silica gel, carbon, zeolite, asbestos, etc. The noble metal catalyst may be used in widely varying proportions, depending upon conditions, as temperature, pressure, etc. However, catalyst in amount within about the range 0.01–10.0% by weight on the compound treated will generally be found sufficient.

In practical procedure, as has been indicated, the temperature and pressure used may be widely varied, it being understood that this invention is not dependent upon the use of any particular temperature or pressure. As illustrative, the temperature used may be within the range 0–150° C. preferably, however, within the range 15–50° C.; while the pressure used may be within the range 1–500 atmospheres, preferably, however, within the range 10–200 atmospheres.

As illustrative of the practical adaptation of this invention, for example, 50 parts of ethyl abietate are dissolved in 148 parts of ethyl alcohol containing 2 parts of acetic acid and the solution agitated with hydrogen, in a suitable vessel, at 25° C., under a pressure of two atmospheres, in the presence of platinum oxide catalyst in the amount of 2% by weight on the ethyl abietate. Such treatment for 2.7 hours will effect 60.5% hydrogenation of the two double bonds of the abietyl radical of the ethyl abietate. Following the same procedure with the use of phosphoric acid in place of acetic will give 68.5% hydrogenation in 2.5 hours.

Following the procedure of the above example with use of 2 cc. of 35% hydrochloric acid in place of the acetic acid, 75.8% saturation of the ethyl abietate may be obtained in 1.7 hours.

As further illustrative, for example, 50 parts of FF wood rosin are dissolved in 148 parts of ethyl alcohol containing 2 parts of hydrochloric acid and the solution agitated with hydrogen, under a pressure of 2 atmospheres, at a temperature of 25° C. in the presence of 2% platinum oxide catalyst. 73% saturation of the two double bonds of the abietyl radical will be obtained in about two hours.

The method in accordance with this invention will be found to be advantageous more especially in that higher percentages of hydrogenation of compounds containing an unsaturated resinic radical can be obtained with more ease and economy in time and materials than by methods heretofore known and used.

What I claim and desire to protect by Letters Patent is:

1. The method of hydrogenating a compound containing an unsaturated resinic radical which includes subjecting the compound in solution in an inert solvent therefor to which an activating acid, as distinguished from the solvent has been added, to hydrogenation in the presence of a noble metal catalyst.

2. The method of hydrogenating a compound containing an abietyl radical which includes subjecting the compound in solution in an inert solvent therefor to which an activating acid, as distinguished from the solvent has been added, to hydrogenation in the presence of a noble metal catalyst.

3. The method of hydrogenating a compound containing an unsaturated resinic radical which includes subjecting the compound in solution in an inert neutral solvent therefor containing an added activating acid to hydrogenation in the presence of a noble metal catalyst.

4. The method of hydrogenating a compound containing an abietyl radical which includes subjecting the compound in solution in an inert neutral solvent therefor containing an added activating acid to hydrogenation in the presence of a noble metal catalyst.

5. The method of hydrogenating a compound containing an unsaturated resinic radical which includes subjecting the compound in solution in an inert organic acidic solvent therefor containing an added activating acid different from the solvent to hydrogenation in the presence of a noble metal catalyst.

6. The method of hydrogenating a compound containing an abietyl radical which includes subjecting the compound in solution in an inert organic acidic solvent therefor containing an added activating acid different from the solvent to hydrogenation in the presence of a noble metal catalyst.

7. The method of hydrogenating a compound containing an unsaturated resinic radical which includes subjecting the compound in solution in an inert solvent therefor to which an activating acid, as distinguished from the solvent has been added, having a high ionization constant to hydrogenation in the presence of a noble metal catalyst.

8. The method of hydrogenating rosin which includes subjecting rosin in solution in an inert solvent therefor, to which an activating acid as distinguished from the solvent has been added, to hydrogenation in the presence of a noble metal catalyst.

9. The method of hydrogenating a compound containing an unsaturated resinic radical which includes subjecting the compound in solution in an inert solvent therefor, to which an activating acid as distinguished from the solvent has been added, to hydrogenation in the presence of a platinum catalyst.

10. The method of hydrogenating a compound containing an unsaturated resinic radical which includes subjecting the compound in solution in an inert solution therefor, to which an activating acid as distinguished from the solvent has been added, to hydrogenation in the presence of a palladium catalyst.

11. The method of hydrogenating an unsaturated resin acid which includes subjecting the unsaturated resin acid in solution in an inert solvent therefor, to which an activating acid as distinguished from the solvent has been added, to hydrogenation in the presence of a noble metal catalyst.

12. The method of hydrogenating an ester of an unsaturated resin acid which includes subjecting the ester of an unsaturated resin acid in solution in an inert solvent therefor, to which an activating acid as distinguished from the solvent has been added, to hydrogenation in the presence of a noble metal catalyst.

13. The method of hydrogenating a rosin ester which includes subjecting the rosin ester in solution in an inert solvent therefor, to which an activating acid as distinguished from the solvent has been added, to hydrogenation in the presence of a noble metal catalyst.

14. The method of hydrogenating glyceryl abietate which includes subjecting glyceryl abietate in solution in an inert solvent therefor, to which an activating acid as distinguished from the solvent has been added, to hydrogenation in the presence of a noble metal catalyst.

15. The method of hydrogenating methyl abietate which includes subjecting methyl abietate in solution in an inert solvent therefor, to which an activating acid as distinguished from the solvent has been added, to hydrogenation in the presence of a noble metal catalyst.

ROLLIN J. BYRKIT, Jr.